United States Patent [19]
Runyon

[11] Patent Number: 4,640,651
[45] Date of Patent: Feb. 3, 1987

[54] COMPUTER MEMORY DISC AND METHOD FOR MACHINING SAME

[75] Inventor: Robert C. Runyon, Dunwoody, Ga.

[73] Assignee: Substrate Systems, Inc., Atlanta, Ga.

[21] Appl. No.: 685,612

[22] Filed: Dec. 28, 1984

Related U.S. Application Data

[63] Continuation-in-part of Ser. No. 680,863, Dec. 12, 1984.

[51] Int. Cl.$^4$ ............................................. B23C 3/13
[52] U.S. Cl. .................... 409/132; 409/145; 409/166; 409/229; 82/1 C; 51/131.5; 51/132
[58] Field of Search .............. 409/131, 132, 139, 145, 409/165–167, 183, 184, 228, 229, 240; 82/1 C, 2 A, 12; 51/131.3, 131.5, 132

[56] References Cited

U.S. PATENT DOCUMENTS

| | | | |
|---|---|---|---|
| 1,723,999 | 8/1929 | Bernard . | |
| 1,809,880 | 6/1931 | Wise | 82/1 C X |
| 2,127,523 | 8/1938 | Kraus | 82/1 |
| 3,155,008 | 11/1974 | Sporck . | |
| 3,486,274 | 12/1969 | David | 51/132 |
| 3,500,589 | 3/1970 | Ellege | 51/132 |
| 3,619,952 | 11/1971 | Leming et al. | 51/132 X |
| 3,711,070 | 6/1973 | Berthiez . | |
| 4,177,699 | 12/1979 | Dovnar et al. | 82/1 |
| 4,179,852 | 12/1979 | Barnett | 51/132 |
| 4,318,250 | 3/1982 | Klievoneit et al. | 51/134 |

FOREIGN PATENT DOCUMENTS

| | | | |
|---|---|---|---|
| 2410823 | 9/1975 | Fed. Rep. of Germany . | |
| 650731 | 3/1979 | U.S.S.R. | 409/132 |
| 657930 | 4/1979 | U.S.S.R. | 409/132 |

Primary Examiner—Gil Weidenfeld
Assistant Examiner—Steven C. Bishop
Attorney, Agent, or Firm—Dale Lischer; J. Rodgers Lunsford, III

[57] ABSTRACT

A method for machining a thin workpiece to equalize machining induced stresses within the workpiece. The method produces a thin workpiece on which the machining lines intersect on the workpiece's machined surface. The method includes passing the workpiece under a fly cutter while at the same time rotating the workpiece.

8 Claims, 12 Drawing Figures

CUTTER RPM = 5000
DISK RPM = 500
FEED IN/MIN = 40
OFFSET (IN.) = 0
SKIP TRACES = 0

FIG 6

CUTTER RPM = 5000
DISK RPM = 500
FEED IN./MIN. = 40
OFFSET (IN.) = 0
SKIP TRACES = 10

FIG 7

CUTTER RPM =5000
DISK RPM =10
FEED IN./MIN. =40
OFFSET (IN.) =0
SKIP TRACES =10

FIG 8

CUTTER RPM =5000
DISK RPM =250
FEED IN./MIN. =40
OFFSET (IN.) =0
SKIP TRACES =10

FIG 9

CUTTER RPM = 5000
DISK RPM = 1000
FEED IN./MIN. = 40
OFFSET (IN.) = 0
SKIP TRACES = 10

FIG. 10

CUTTER RPM = 5000
DISK RPM = 1800
FEED IN./MIN.= 40
OFFSET (IN.) = 0
SKIP TRACES = 10

FIG 44

CUTTER RPM = 5000
DISK RPM = 3000
FEED IN./MIN. = 40
OFFSET (IN.) = 0
SKIP TRACES = 10

FIG. 12

CUTTER RPM = 5000
DISK RPM = 2500
FEED IN./MIN. = 40
OFFSET (IN.) = 0
SKIP TRACES = 10

COMPUTER MEMORY DISC AND METHOD FOR MACHINING SAME

RELATED APPLICATION

This application is a continuation-in-part of application Ser. No. 680,863, filed Dec. 12, 1984.

BACKGROUND OF THE INVENTION

This invention relates generally to hard computer memory discs, and more particularly concerns a method for machining the memory disc's thin aluminum substrate to assure that the resulting memory disc has a high degree of flatness.

A computer memory disc stores computer information on the magnetic coating on the surface of the memory disc. The information stored on the disc is read off the disc by a read head that is indexed across the disc as the disc spins at a high rate of speed. In order to pack the most information in the smallest amount of space on the disc, it is necessary to have the read head track as close to the disc surface as possible. In accordance with standard practice, the read head literally floats above the disc on a thin film of air. Because the read head tracks so close to the disc surface, it is important that the disc be as flat as possible.

In accordance with prior art practices, computer memory discs are made by machining a very thin aluminum disc to a finished surface. The finished surface of the aluminum disc is then electroplated with nickel to fill in any gaps or holes in the surface. The nickel finish is polished and is then coated with a very thin layer of cobalt, which is the magnetic material on which the computer information is recorded. In addition to filling gaps in the aluminum surface, the nickel also provides an interface between the aluminum substrate and the cobalt to assure adhesion of the cobalt to the aluminum surface.

As an alternative to the nickel/cobalt disc configuration, the finished aluminum disc is coated with an epoxy material containing iron particles by spraying the epoxy material onto the spinning disc. The magnetic material is magnetically aligned while the epoxy is still wet, the disc is baked, and the coating is then polished flat.

There are several methods available for machining the aluminum substrate. Each method has its own disadvantages. One prior art method first uses a carbide or cemented diamond tool to rough turn the aluminum disc. The rough turning operation produces a spiral pattern similar to the pattern of the groove in an ordinary phonograph record. The rough turning, spiral cutting process produces stresses in the thin aluminum disc, which stresses cause the thin aluminum disc to assume a slightly concave/convex configuration called dishing. In order to eliminate the concave/convex configuration the rough finished aluminum discs are stacked between ground and lapped ceramic plates, loaded with between 25–100 psi of pressure, and inserted into a furnace to remove the concave/convex configuration. For aluminum discs that have been annealed, heat flattening can be accomplished at approximately 580° F. Otherwise the temperature must exceed 650° F. in order to anneal and thus flatten the disc.

The resulting heat flattened aluminum disc is then given a final finished by spiral cutting again. Even though the final turning removes only a very small amount of material, the final turning still produces sufficient spiral stresses to cause dishing of the aluminum disc. In order to eliminate the dishing in the finished aluminum disc, the disc is electroplated with a sufficiently thick layer of nickel to fill in the concave/convex configuration. The nickel plated disc must then be polished to remove the excess nickel to achieve the requisite flatness. The heat flattening, extra nickel coating, and extra polishing to remove the excess nickel, of course, add cost to the finished product.

Another method of producing the finished aluminum discs begins by double disc grinding the rough aluminum disc blanks. Double disc grinding in most cases produces a very flat part because the grinding takes place simultaneously on both sides of the aluminum disc. The difficulty with the double disc grinding is that sub-micron particles are buried in the inclusions of the aluminum surface. Moreover, the resulting surface is usually too coarse to simply be polished prior to coating with nickel. Usually double disc ground aluminum discs are ground to 0.077 inch thickness because random scratches created by the abrasives may be from 0.0008 to 0.0015 inches deep. Therefore, a substantial amount of material must be removed from the disc during the polishing process in order to eliminate the deep scratches. Polishing that amount of material, of course, is not cost effective, especially where a grain of abrasive from the rough double disc grinding may be freed from an inclusion and contaminate the diamond polishing pads. Therefore, it is usually necessary to undertake a second disc grinding with a finer abrasive prior to final polishing. The three step process, double disc grinding (rough), disc grinding (medium), and finish polishing, is not cost effective although the resulting finished aluminum disc is sufficiently flat to be economically coated with nickel and polished before being coated with cobalt.

Another method of machining the aluminum disc begins with the same double disc grinding process to remove the rough material. The double disc ground aluminum discs are then turned in a spiral pattern on a lathe to remove 0.001 to 0.0015 inches of material to provide the final finish. Although the final turning process removes a very small amount of material, the parallel spiral stresses still result in dishing of the aluminum disc. That dishing as previously described must be eliminated by coating an excess amount of nickel and then polishing off the extra nickel to bring the resulting nickel coated disc back to requisite flatness.

SUMMARY OF THE INVENTION

It is therefore an object of the present invention to provide a method for machining an aluminum disc or other thin workpiece (including without limitation washers, seals, mirrors, etc., all of various machinable materials) in a single step that creates the desired smooth finish on the aluminum disc surface and assures that the aluminum disc has the requisite degree of flatness.

It is also an object of the present invention to provide a thin, machined disc or other thin workpiece on which the lines of stress created by the machining intersect and cross at various angles in order to equalize the stresses within the disc and thereby avoid warping.

In order to achieve the above objective, the aluminum disc blanks are machined by passing the thin disc or other thin workpiece under a fly cutter with peripheral mounted diamond cutting tools while at the same time rotating the disc. As soon as one side has been machined in that manner, the disc is turned over and machined on the other side so that the side to side stresses are equalized as well.

By turning the aluminum disc as it is passed under the fly cutter, the machining lines on the aluminum disc's surface, which are generally arc-shaped, intersect and cross each other at various angles on subsequent passes of the cutting tool. As a result of the crossing and intersecting of the machining lines, the stresses induced within the thin aluminum disc tend to equalize each other so that the disc does not tend to warp as a result of the induced stresses from the machining process, and the aluminum disc retains a high degree of flatness.

The machining line pattern is determined primarily by the number of tools on the fly cutter and the ratio of the angular velocity of the fly cutter to the angular velocity of the disc. The transverse feed rate of the disc past the fly cutter and angular velocity of the fly cutter determine the surface finish, and a surface finish of approximately one micro-inch (arithmetic average) can be achieved.

Other objects and advantages of the invention will become apparent upon reading the following detailed description and upon reference to the drawings.

BRIEF DESCRIPTION OF THE DRAWINGS

FIGS. 5 through 12 are computer generated schematic representations of the machining line patterns produced on the aluminum substrate by the fly cutter machine for various ratios of angular velocity of the fly cutter to the angular velocity of the disc for a single tool fly cutter.

DETAILED DESCRIPTION OF THE INVENTION

While the invention will be described in connection with the preferred embodiment and process, it will be understood that I do not intend to limit the invention to that embodiment or process. On the contrary, I intend to cover all alternatives, modification, and equivalents as may be included within the spirit and scope of the invention as defined by the appended claims.

Figure 1:
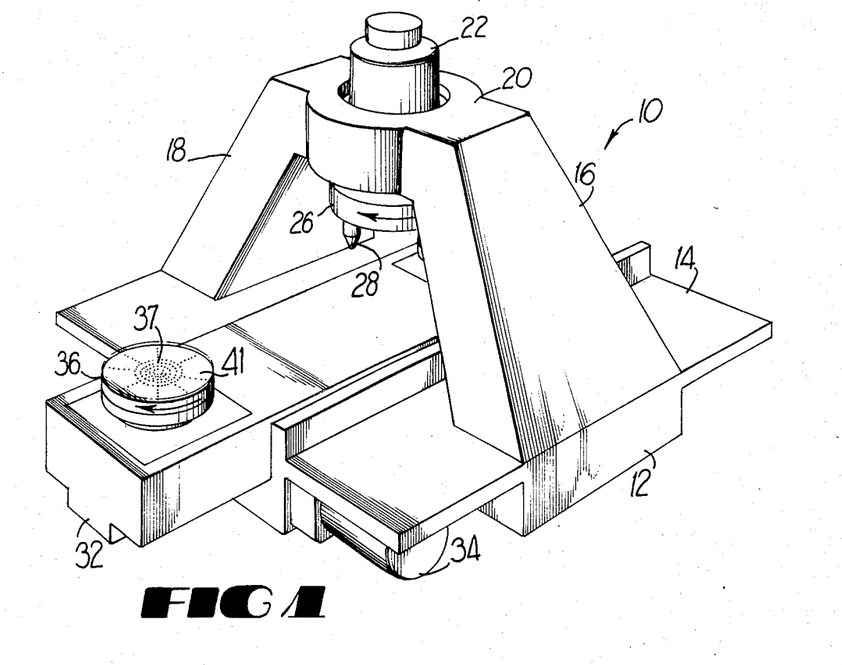
FIG. 1 is a perspective drawing of a fly cutter machine on which the process of the present invention can be carried out to produce a thin disc or other thin workpiece within which machine line stresses ar equalized.

Turning to FIG. 1, there is shown a fly cutter machine 10 which can be used in carrying out the process of the present invention to produce finished and semi-finished thin discs or other thin workpieces (including washers, seals, mirrors, etc.) in which the stresses produced by the machining lines have been equalized so as to avoid warping of the thin disc. The fly cutter machine 10 includes a base 12 with a rail 14. A yoke 20 is supported above the rail 14 by columns 16 and 18. A motor 22 is mounted within the yoke 20. A fly cutter 26 is connected to the motor 22 for rotation. The illustrated fly cutter 26 has two diamond cutting tools 28 and 30 mounted about its periphery. One or a greater number of equally spaced diamond tools can be provided on the periphery of the fly cutter 26.

A slide 32 is mounted on the working surface 14 and is driven transversely past the fly cutter 26 by means of a slide driving motor 34. The slide has two vacuum or pneumatic chucks 36 and 38 mounted at either end. The chucks are each rotated by means of a motor within the sliding member (not shown). The pneumatic chucks 36 and 38 are provided with a series of holes 37 and 39 in their top surfaces 41 and 43 respectively. The holes are connected to a source of vacuum in order to hold a flat disc or workpiece on the top surface of each of the pneumatic chucks. Each pneumatic chuck is also provided with a braking means to stop the chuck to allow removal and replacement of discs on the top surface of the chuck. The top surface 41 of chuck 36 is slightly higher than the surface 43 of chuck 38 so that the disc can be machined on one side on chuck 38 and then turned over and machined on its other side on chuck 36. Consequently, the difference in height should be equal to the depth of cut made by the fly cutter on the first side of the disc. The requisite difference in height between the chucks can also be provided by placing a shim on chuck 36.

Figure 2:
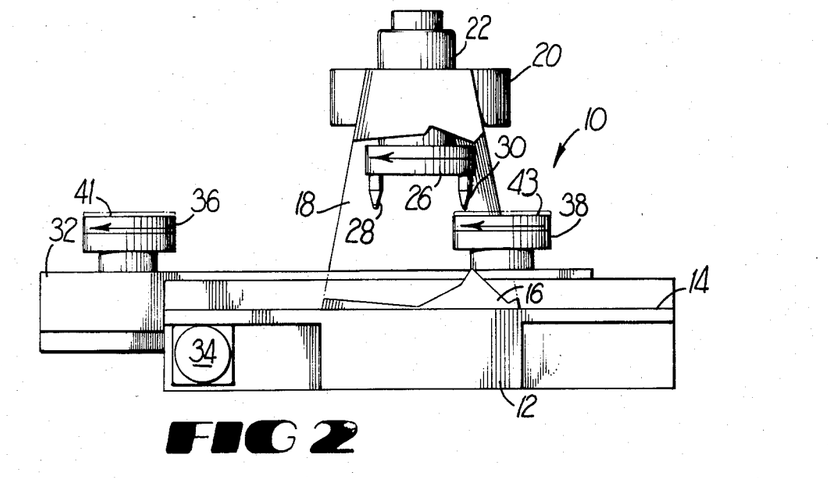
FIG. 2 is a front elevation view of the fly cutter machine.
Figure 3:
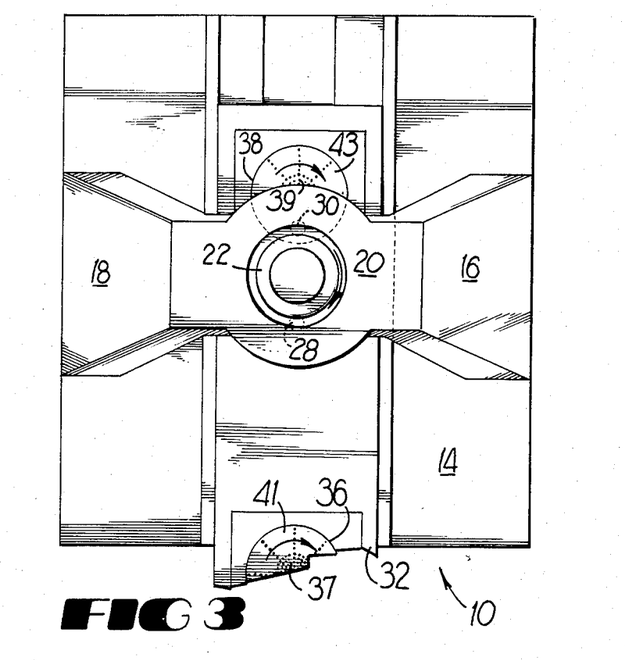
FIG. 3 is a top plan view of the fly cutter machine.
Figure 4:
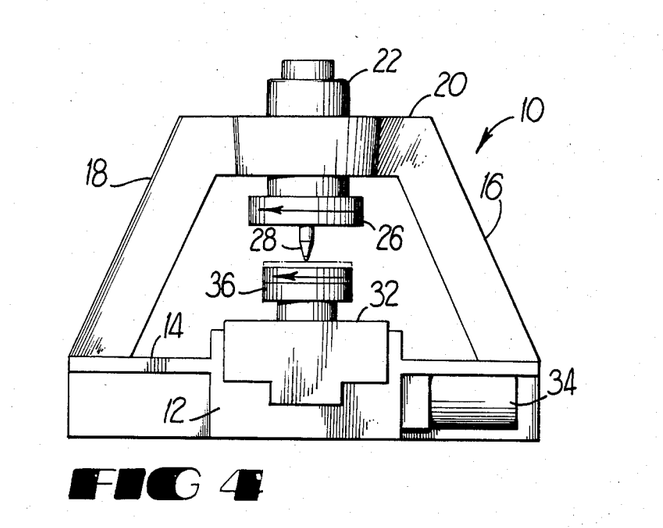
FIG. 4 is a side elevation view of the fly cutter machine.

In order to carry out the machining process of the present invention, the fly cutter 26 is first rotated by motor 22. An aluminum blank (approximately five inches in diameter) is placed on pneumatic chuck 38, for example. A vacuum is pulled through the holes 39 in the top of the pneumatic chuck 38 to secure the aluminum disc to the pneumatic chuck 38. Once the aluminum disc is mounted on the pneumatic chuck 38, the pneumatic chuck 38 is rotated. The slide 32 is then propelled by motor 34 in the leftward transverse direction (FIG. 2) so as to bring the pneumatic chuck 38 with the attached aluminum disc under the fly cutter 26. As the fly cutter 26 rotates and as the aluminum disc on the pneumatic chuck 38 rotates, the fly cutter's diamond tools 28 and 30 inscribe a machining line pattern on the aluminum disc as the disc is machined. Once the pneumatic chuck 38 reaches approximately the center of the fly cutter, motor 34 reverses and drives slide 32 rightward (FIG. 2). Once the pneumatic chuck 38 is out from under the fly cutter 26, the chuck is stopped by the braking means, the vacuum is released, and the disc is removed from the chuck 38 and replaced by another disc.

While the first disc on pneumatic chuck 38 is being machined, a second disc, which has been previously machined on chuck 38 on one side can be placed on pneumatic chuck 36, which is higher than chuck 38. When the slide 32 is then driven in the other direction (rightward in FIG. 2) by motor 34, the second disc on pneumatic chuck 36 can be machined on its other side while the first disc is being removed from chuck 38 and turned over for subsequent machining on its other side on chuck 36.

In carrying out the procedure on the fly cutter, it is contemplated that the discs will be machined on both sides within a very short period of time in order to assure that the side to side stresses are equalized as much as possible. While machining one side of a thin workpiece in conformity with the present invention produces a flat workpiece compared to prior spiral machining methods, machining the other side of the workpiece improves the results by equalizing the residual stresses on the second side before they can warp the disc through side to side equalization. The sooner the second side is machined the better. The time between machining the sides depends on the amount of residual stresses, the amount of material removed, and the material itself. For aluminum discs machined in accordance with the present process, improved flatness can be achieved if the second side is machined within several hours after the first side has been machined.

The finish on the disc is determined by the angular velocity of the fly cutter, the transverse feed rate of the disc on the slide, and the radius of the tool. The finish is defined by the maximum distance of the peak to valley of the cut in the surface, which is defined by the formula:

$$\text{Surface finish} = \frac{\left(\frac{\text{Transverse feed rate}}{\text{Tool rotation rate}}\right)^2}{8r}$$

Surface finish is the maximum peak to valley dimension of the finish and is expressed in micro inches. The transverse feed rate is expressed in inches/minute, and the tool rotation rate is expressed in revolutions per minute. The value of r is the radius of the diamond tool and is expressed in inches.

In setting up the machining process of the present invention for producing a semi-finished aluminum disc, a standard fly cutter angular velocity of 5,000 rpm is selected. In order to provide the appropriate levels of production, a transverse feed rate of approximately 40 inches per minute is selected, and a standard tool radius of 0.25 inches is considered appropriate for each of the two diamond tools 28 and 30 mounted on the fly cutter. As a result the surface finish can be calculated:

$$\text{Surface finish (inches peak to valley)} = \frac{\left(\frac{40 \text{ in./min.}}{5,000 \text{ rev./min.}}\right)^2}{8(.25)}$$

$$= 0.000032 \text{ inch}$$

In order to provide a higher degree of finish, a higher angular velocity of the fly cutter, a lower rate of transverse feed, or a larger tool radius can be provided, and vice versa. For example a fine finish can be provided by reducing the feed rate to 20 inches per minute and substituting a 2 inch radius final cut tool for one of the 0.25 inch tools on the fly cutter:

$$\text{Surface finish (inches peak to valley)} = \frac{\left(\frac{20 \text{ in./min.}}{5,000 \text{ rev./min.}}\right)^2}{8(2.0)}$$

$$= 0.000001 \text{ inch}$$

Because the pneumatic chuck is turning at the same time that the fly cutter is turning, the pattern inscribed by the diamond tools on the surface of aluminum disc comprises crossing and intersecting machining lines which produce crossing and intersecting lines of stress within the disc. Because the induced stress lines are not parallel, like those of a spiral cut disc, they tend to cancel each other and to equalize across the surface of the disc, thereby eliminating the tendency of the disc to warp.

As previously stated, the machine line patterns on the disc are determined primarily by the number of tools on the fly cutter and the ratio of the fly cutter's angular velocity to that of the disc's angular velocity. Particularly, the machine pattern may be defined by a number $(P_n)$ which is defined as:

$$P_n = N_t \left(\frac{\omega_c}{\omega_d}\right)$$

where $N_t$ is the number of equally spaced tools on the fly cutter, $\omega_c$ is the angular velocity of the fly cutter, and $\omega_d$ is the angular velocity of the disc.

The patterns are independent of the rate of transverse feed of the disc as long as the rate of transverse feed is several orders of magnitude less than the linear velocity of the fly cutter tool. If, for example, the fly cutter has a two and one-half inch radius and revolves at 5,000 rpm, the linear velocity of the tool equals 5,000 revolutions per minute times $2\pi r$ which equals 78,539.82 inches per minute as compared to the 40 inches per minute of the transverse feed.

Varying the ratio of the diameters of the fly cutter and the disc will produce different patterns in terms of scale. If, for example, the fly cutter's diameter is increased to twice the diameter of the disc, the resulting pattern on the disc would simply be the pattern that is present on the center portion of the disc machined by a fly cutter having the same diameter as the disc. As a result, while the pattern changes in terms of its scale with the changing diameters of cutter and disc, the basic pattern with its criss-crossing lines is not affected by changing the diameter of the disc and the fly cutter.

With regard to the pattern number $(P_n)$ which is a multiple of the ratio of the angular velocity of the fly cutter to the angular velocity of the disc, it has been found that any pattern numbers less than infinity (the disc angular velocity is zero) and greater than one produce criss-crossing machining lines with the exception of a pattern number of precisely 2:1 which produces a series of straight parallel lines across the disc. Of course, pattern numbers approaching the limits of 1, infinity, and 2:1 provide less criss-crossing than those that are well within the acceptable ranges. As long as criss-crossing, non-parallel machine lines are produced on the disc, the stresses created by the machining process tend to equalize and thereby avoid the tendency toward warping of the disc.

In order to illustrate the disc of the present invention that results from the machining process, a five-inch diameter disc is selected to be machined by using a single-tooled fly cutter ($N_t=1$) having a radius of two and one-half inches. FIGS. 5 through 12, which were produced by computer modeling, illustrate the machining line patterns, and therefore stress patterns, induced within the five-inch disc. For each of the FIGS. 5 through 12, the fly cutter has an angular velocity of 5,000 rpm, and the transverse feed rate of the disc is 40 inches per minute. The angular velocity of the disc is varied to illustrate the effect on the stress pattern of varying the ratio of fly cutter's angular velocity to disc's angular velocity.

Figure 5:
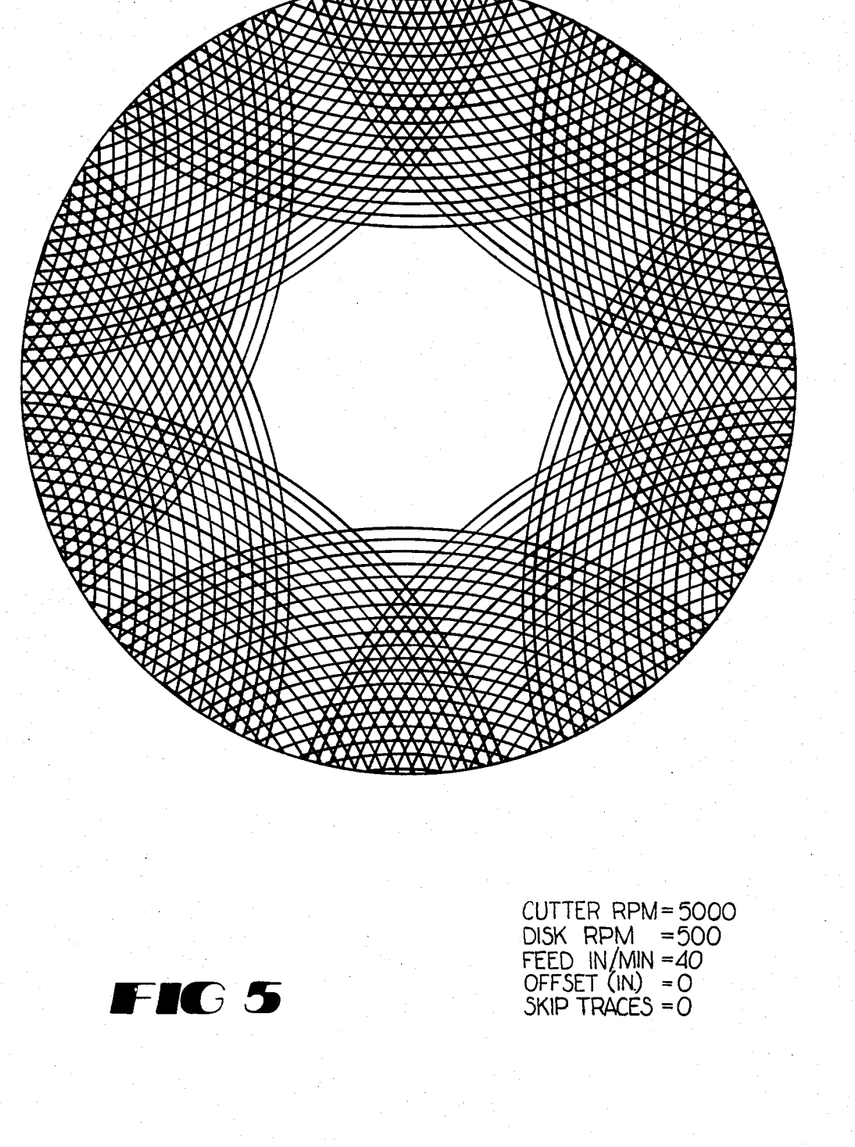

FIG. 5 shows the machine line pattern when the disc is being turned at an angular velocity of 500 revolutions per minute (the ratio of 10:1). For the purposes of illustration only, the disc in FIG. 5 has only been fed about one-third of the way under the fly cutter in the transverse direction. Feeding the disc all the way under the fly cutter would result in the machining lines tracing upon each other to such an extent that the entire surface would become blurred of any discernable pattern. As can be seen from the illustrative pattern in FIG. 5, the machining line pattern is made up of a series of arcs which cross and recross each other at various angles. The result is that the stress lines which follow the machining lines are not parallel to each other across the entire surface of the disc. Because the machining lines cross and recross, the stress lines cross and recross each other, thereby tending to equalize each other and eliminate the tendency toward warping of the thin disc.

Figure 6:
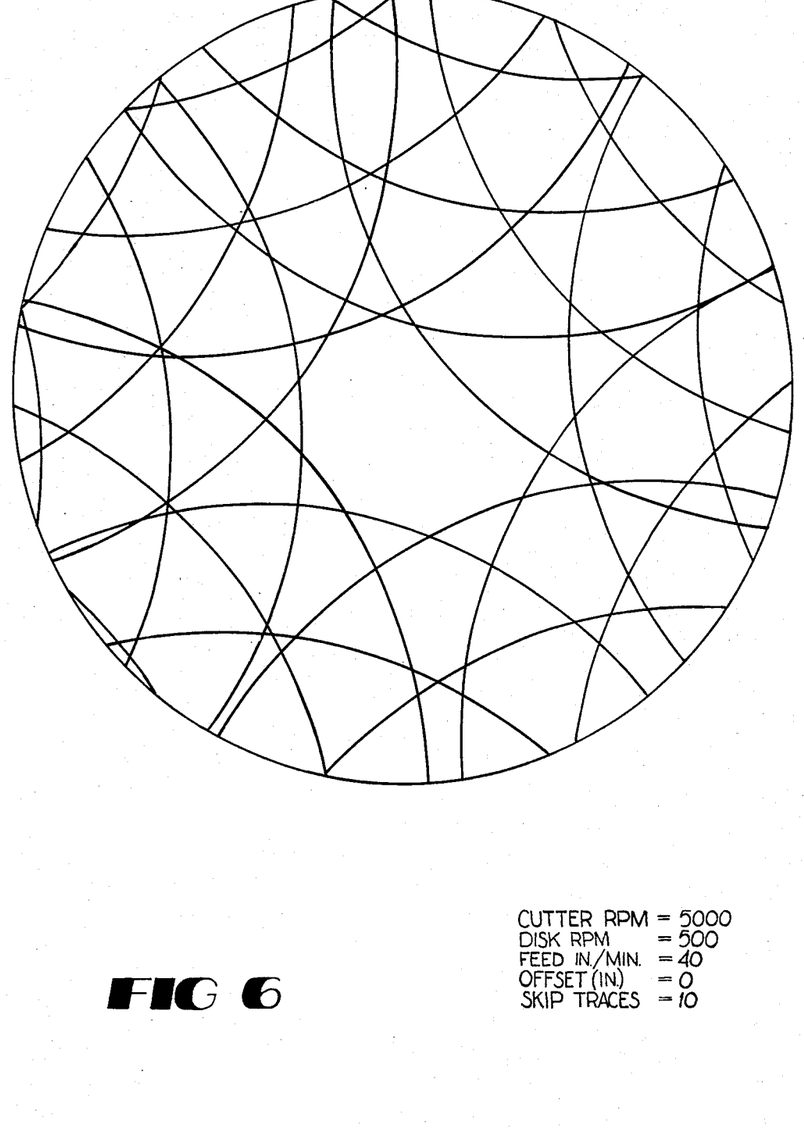

FIG. 6 illustrates the same machining process as illustrated by FIG. 5. The fly cutter is turned at 5,000 rpm, the disc is fed in a transverse direction at 40 inches per minute, and the disc is turned at 500 rpm. The difference between FIG. 5 and FIG. 6 is that in FIG. 6, only every tenth machining line has been shown, in order to provide clarity of the pattern. Again, it can be easily seen that the machining lines, and therefore the stress lines, tend to cross and recross each other on the surface of the disc, thereby tending to equalize the stresses.

The remaining figures show the various criss-crossing patterns produced for different pattern numbers resulting from different angular velocity ratios between the fly cutter's angular velocity and the disc's angular velocity.

Figure 7:
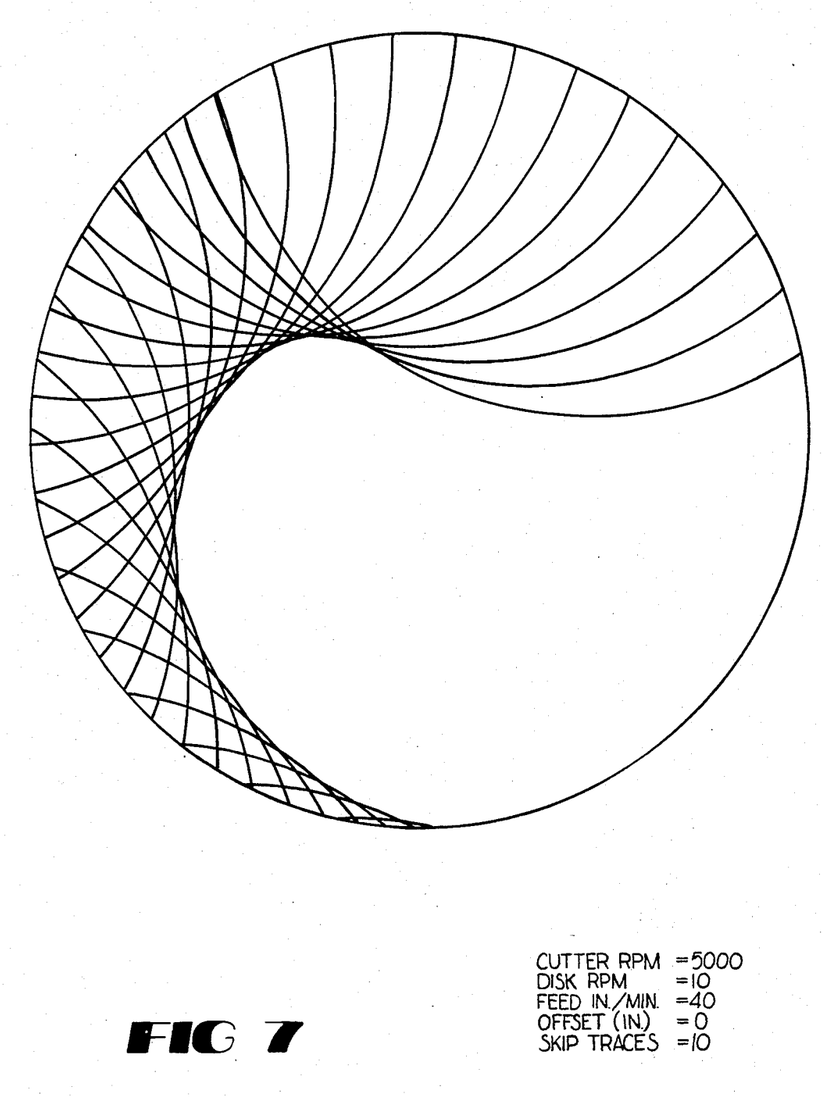

FIG. 7 shows the pattern produced when the disc is turned at ten rpm. While FIG. 7 illustrates only a portion of the pattern which results from feeding the disc about a third of the way under the fly cutter, it still illustrates that even for very low disc rpm (and a high pattern number 500:1), the machining lines cross and recross each other along the surface of the disc, thereby tending to relieve the stresses on the disc.

Figure 8:
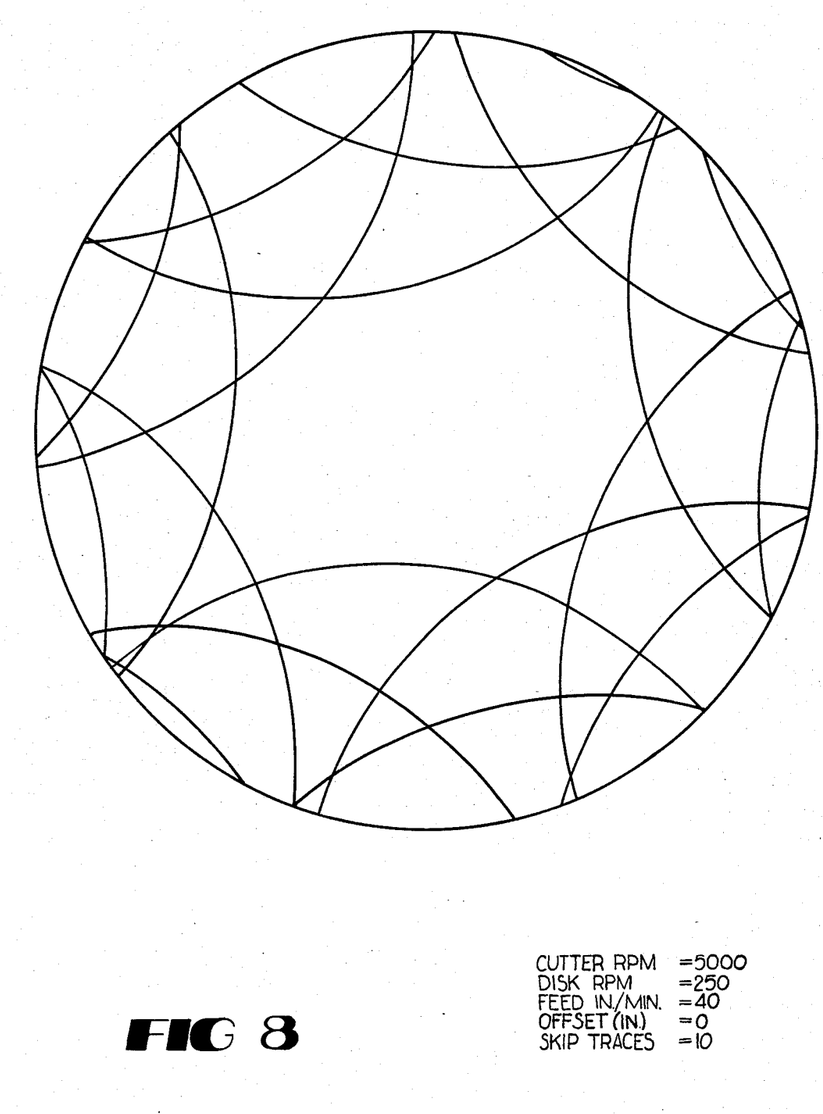

FIG. 8 illustrates a disc produced by turning the disc at 250 rpm (pattern number equals 20:1). Again the pattern produced illustrates the crossing and recrossing of the stress lines on the disc.

Figure 9:
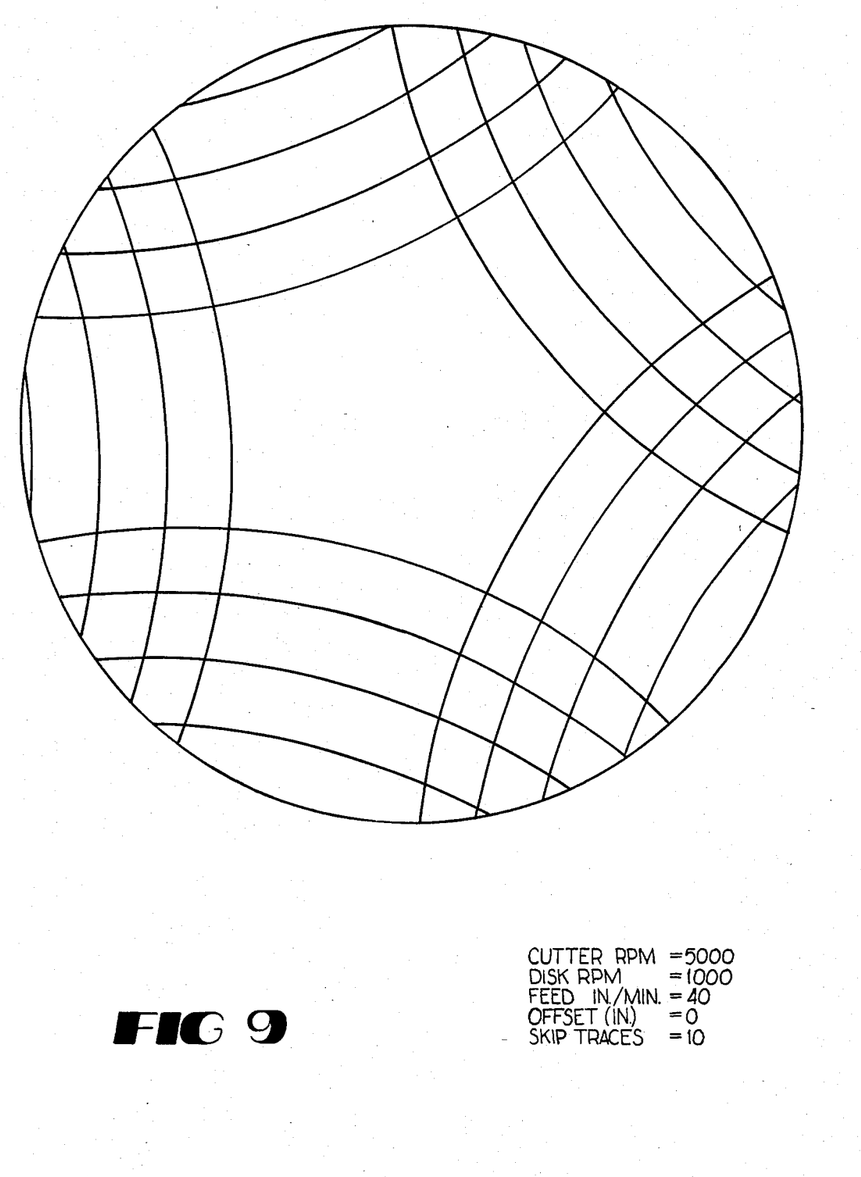

FIG. 9 shows the disc surface where the disc is rotated at 1,000 rpm (pattern number equals 5:1).

Figure 10:
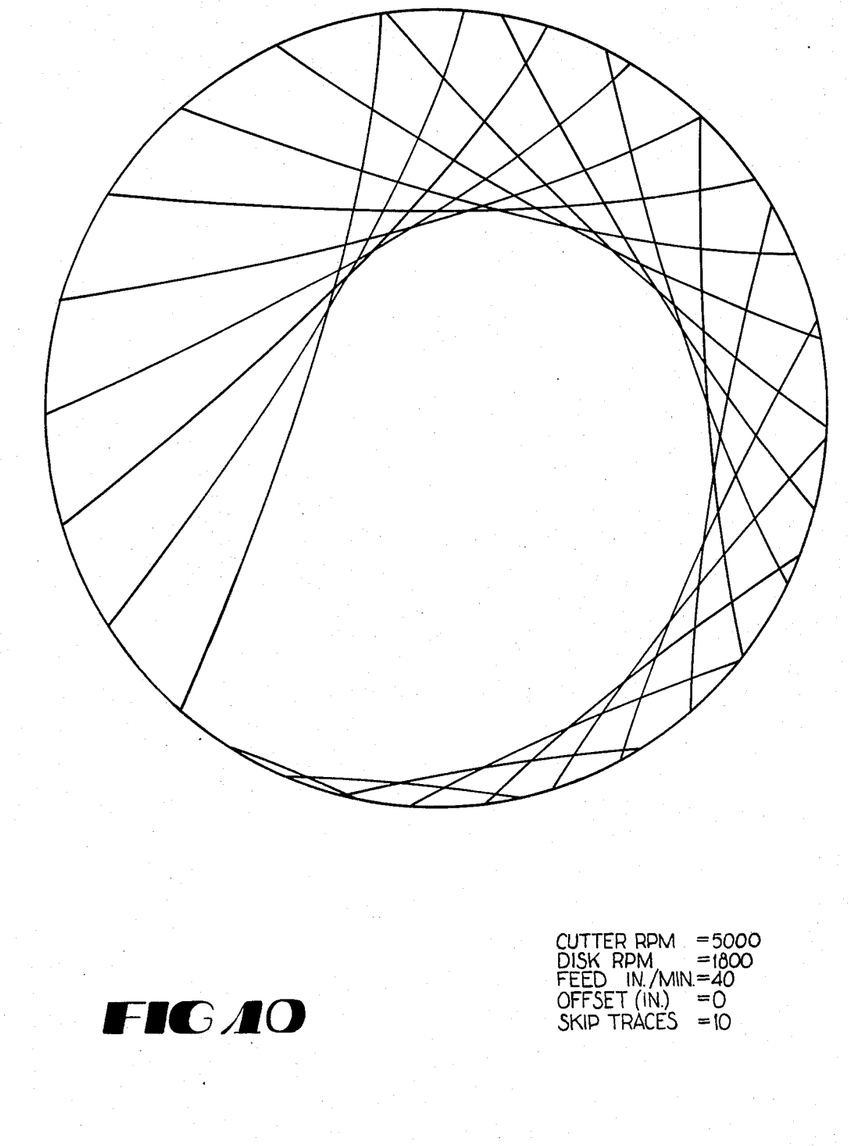

FIG. 10 illustrates the machining line pattern when the disc is rotated at 1,800 rpm (pattern number equals 2.77:1).

FIG. 11 illustrates the machining line pattern when the disc is rotated at 3,000 rpm (pattern number equals 1.67:1).

Figure 12:
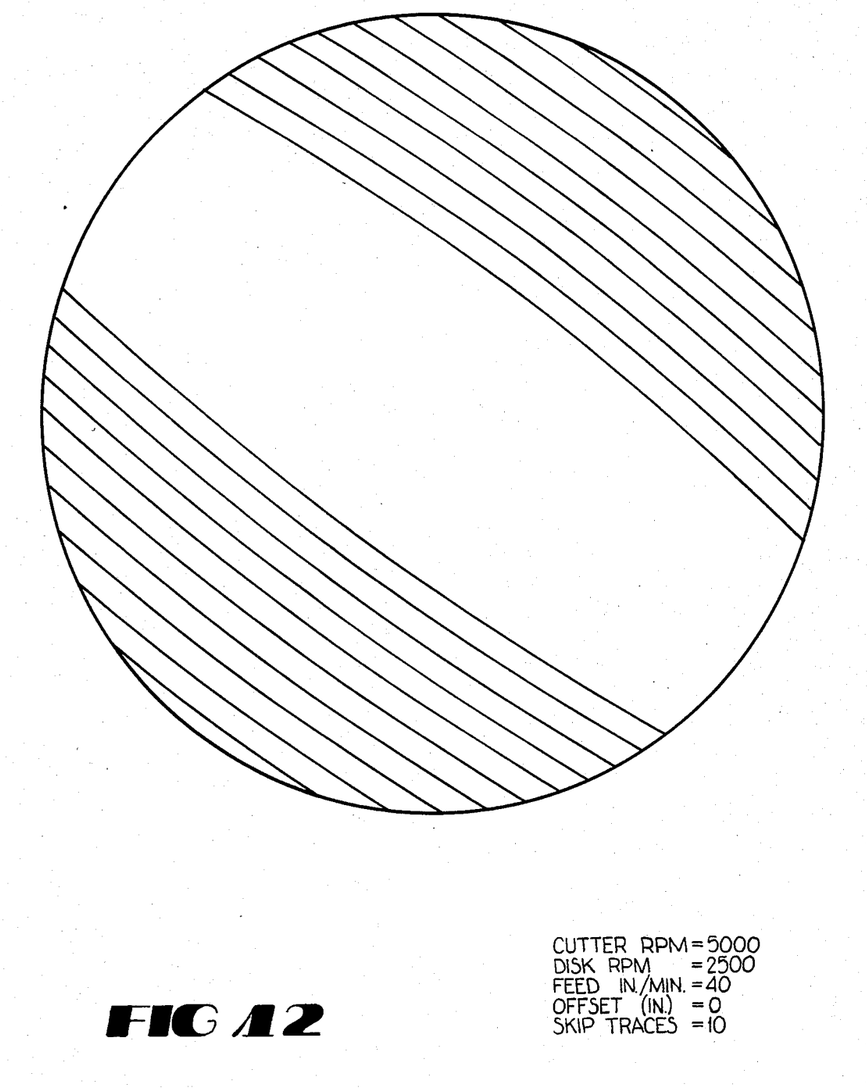

Finally, FIG. 12 illustrates an anomaly found for pattern numbers between infinity and one, particularly the pattern number of 2:1 for a single tool and a 2:1 ratio for the angular velocity of the fly cutter to that of the disc. FIG. 12 illustrates the machine line pattern for a single-tool fly cutter having an angular velocity of 5,000 rpm and a disc angular velocity of 2,500 rpm. It should be noted that the machining lines are essentially straight, parallel lines across the surface of the disc. That particular pattern produces parallel stress lines which would cause the disc to warp along those lines of stress, producing a saddle-backed warped configuration. The pattern number of 1:1 of cutter angular velocity to disc angular velocity produces a similar straight line pattern which again is considered unacceptable.

I claim:

1. A method for machining a thin workpiece with a fly cutter having a periphery with a tool mounted thereon to avoid stress warping of the workpiece wherein the workpiece has a surface and the tool engages the workpiece and produces machining lines on the surface of the workpiece, which machining lines result in corresponding lines of stress within the workpiece, the method comprising the steps of:
    (a) rotating the fly cutter at an angular velocity, which angular velocity produces a corresponding linear velocity for the tool;
    (b) rotating the workpiece at an angular velocity; and
    (c) feeding the rotating workpiece past the rotating fly cutter at a transverse feed rate, which feed rate is at least an order of magnitude less than the linear velocity of the tool.

2. The method of claim 1 wherein the angular velocity of the fly cutter is greater than the angular velocity of the workpiece.

3. The method of claim 1 or 2, wherein the fly cutter has a number of tools greater than or equal to one equally spaced on its periphery and for all angular velocities of the fly cutter, for all angular velocities of the disc, and for all numbers of tools the product of the number of tools and the ratio of the angular velocity of the fly cutter to the angular velocity of the workpiece is within a range greater than 1 and less than 2 or greater than 2 and less than infinity.

4. The method of claim 1 or 2, wherein the thin workpiece is turned over and steps a, b, and c of claim 1 are repeated.

5. A thin workpiece which comprises a machined surface on at least one of its sides wherein the machined surface results from:
    (a) rotating a fly cutter having a periphery with a cutting tool mounted thereon at an angular velocity, which angular velocity produces a corresponding linear velocity for the tool;
    (b) rotating the workpiece at an angular velocity; and
    (c) feeding the rotating workpiece past the rotating fly cutter at a transverse feed rate, which feed rate is at least an order of magnitude less than the linear velocity of the tool.

6. The thin workpiece of claim 5, wherein the angular velocity of the fly cutter is greater than the angular velocity of the workpiece.

7. The thin workpiece of claim 5 or 6, wherein the fly cutter has a number of tools greater than or equal to one equally spaced on its periphery and for all angular velocities of the fly cutter, for all angular velocities of the disc, and for all numbers of tools the product of the number of tools and the ratio of the angular velocity of the fly cutter to the angular velocity of the workpiece is within a range greater than 1 and less than 2 or greater than 2 and less than infinity.

8. The thin workpiece of claim 5 or 6, wherein the thin workpiece is turned over and steps a, b, and c of claim 5 are repeated.

* * * * *